United States Patent
Choi et al.

(10) Patent No.: US 6,847,499 B2
(45) Date of Patent: Jan. 25, 2005

(54) OPTICAL HEAD AND METHOD OF ADJUSTING OPTICAL PATH THEREOF

(75) Inventors: Jong-chul Choi, Gyeonggi do (KR);
Jin-kyung Lee, Gyeonggi-do (KR);
Chong-sam Chung, Gyeonggi-do (KR);
Tae-kyung Kim, Seoul (KR); Kwang Kim, Gyeonggi-do (KR); Jin-won Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/460,670

(22) Filed: Jun. 13, 2003

(65) Prior Publication Data
US 2004/0174621 A1 Sep. 9, 2004

(30) Foreign Application Priority Data
Mar. 7, 2003 (KR) ................................ 10-2003-0014480

(51) Int. Cl.$^7$ ................................................. G02B 7/02
(52) U.S. Cl. ............... 359/819; 369/44.14; 369/112.09; 369/112.14
(58) Field of Search .................. 359/823, 821, 359/819; 369/44.14, 75.2, 112.05–112.06, 112.08–112.1, 112.13–112.15, 112.21, 112.23, 112.28–112.29

(56) References Cited

U.S. PATENT DOCUMENTS

| | | | |
|---|---|---|---|
| 5,101,389 A | * | 3/1992 | Ohuchida et al. ........ 369/44.23 |
| 6,411,581 B1 | * | 6/2002 | Saitou et al. ............. 369/75.1 |
| 6,564,009 B2 | * | 5/2003 | Owa et al. ................. 386/126 |
| 2002/0041562 A1 | * | 4/2002 | Redmond et al. ...... 369/112.19 |
| 2003/0021219 A1 | * | 1/2003 | Nagai ........................ 369/244 |

FOREIGN PATENT DOCUMENTS

WO            01/43126        6/2001

\* cited by examiner

*Primary Examiner*—Ricky Mack
*Assistant Examiner*—Brandi Thomas
(74) *Attorney, Agent, or Firm*—Stein, McEwen & Bui, LLP

(57) ABSTRACT

An optical head includes a substrate, a laser diode, a photodetector, an objective lens, a prism, and an optical element. The laser diode is installed on the substrate and emits light. The photodetector is installed on the substrate and receives the light. The objective lens is installed on a first side of the substrate and focuses the light emitted from the laser diode onto a recording surface of a disc. The prism is installed on a second side of the substrate, transmits the light emitted from the laser diode toward the objective lens, and transmits the light reflected from the recording surface toward the photodetector. The optical element adjusts an optical path formed between the substrate and the prism.

30 Claims, 6 Drawing Sheets

OPTICAL HEAD AND METHOD OF ADJUSTING OPTICAL PATH THEREOF

CROSS-REFERENCE TO RELATED APPLICATIONS

This application claims the priority of Korean Patent Application No. 2003-14480, filed on Mar. 7, 2003, in the Korean Intellectual Property Office, the disclosure of which is incorporated herein in its entirety by reference.

BACKGROUND OF THE INVENTION

1. Field of the Invention

The present invention relates to an optical head used in an optical pickup device and a method of adjusting an optical path thereof.

2. Description of the Related Art

An optical pickup device generally includes an optical head having a laser diode (LD) emitting light to a recording medium and a photo diode receiving the light reflected from the recording medium.

FIG. 1 illustrates a structure of a conventional optical head disclosed in PCT International Publication No. WO 01/43126 A2. The conventional optical head includes a substrate 8, an LD 5, a mirror 6, a prism 4 having a polarized light division function, a quarter wave plate 3, an objective lens 1, and a photodetector (PD) 7. In the above structure, light emitted from the laser 5 is reflected from the mirror 6 and reflective surfaces 4a and 4b of the prism 4 and then is converted into circularly polarized light by the quarter wave plate 3. The circularly polarized light is condensed by the objective lens 1 and then reaches a recording surface of a disc D. Thereafter, the light reflected from the recording surface of the disc D is converted into linearly polarized light by the quarter wave plate 3. Next, the linearly polarized light passes through the reflective surface 4a, is reflected from a reflective surface 4c, and returns to the PD 7. A height H of the optical head is about 3 mm.

The optical head is generally assembled according to the following process. As shown in FIG. 2, the prism 4, the quarter wave plate 3, a spacer 2, and the objective lens 1 are stacked to be attached to each other, thereby completing a first assembly body 10. As shown in FIG. 3, the first assembly body 10 is combined with a second assembly body 20, which is completed by assembling the substrate 8, the LD 5, and the PD 7. Reference numeral 9 denotes a radiating plate.

However, as is observed during a test for emitting and receiving the light after the assembling process, the light frequently deviates from a designed optical path. Stacking and assembling optical elements of the optical head are precisely performed using an align mark as a zero reference. However, since a tolerance exists in manufacturing the optical elements, although the optical elements are precisely assembled, the light may deviate from the optical path. Accordingly, relative positions of the first and second assembly bodies 10 and 20 have to be adjusted when being assembled in order to compensate for the deviation of the light from the optical path. In other words, the relative positions of the first and second assembly bodies 10 and 20 have to be adjusted so that the light emitted from the LD 5 is reflected from the recording surface of the disc D and then reaches a center of the PD 7. As shown in FIG. 4, the adjustment of the relative positions of the first and second assembly bodies 10 and 20 is achieved by rotating the first assembly body 10 around a Z-axis (corresponding to the light reflected from the mirror 6) and detecting changes in a state of an optical spot focused on the PD 7. A trajectory of the optical spot focused on the PD 7 is indicated by a dashed line in FIG. 5.

However, when the assembling process is carried out with a signal sensed by the PD 7, the first assembly body 10 rotates around the Z-axis. Thus, the assembling process does not affect the optical path through which the light is transmitted, i.e., the optical path from the LD 5 to the objective lens 1. However, if the trajectory of the optical path fails to pass through the center of the PD 7 and shifts due to the manufacturing tolerance, the first assembly 10 has to horizontally move toward an X-axis or a Y-axis of FIG. 4 so that the trajectory passes through the center of the PD 7. Then, the optical path through which the light is transmitted, re-deviates during adjusting of the optical path through which the light is focused onto the PD 7. Thus, it is quite difficult to correct the light deviating from the optical path. Also, since the optical head has a structure in which the optical elements are stacked on the substrate 8, the height of the optical head becomes higher.

Accordingly, an optical head having a new structure is demanded to solve these problems.

SUMMARY OF THE INVENTION

The present invention provides an optical head having an improved structure which is appropriate for making a product slim and which allows an easy adjustment of an optical path, and a method of adjusting the optical path thereof.

Additional aspects and advantages of the invention will be set forth in part in the description which follows and, in part, will be obvious from the description, or may be learned by practice of the invention.

According to an aspect of the present invention, an optical head includes a substrate, a laser diode, a photodetector, an objective lens, a prism, an optical element. The laser diode is installed on the substrate and emits light. The photodetector is installed on the substrate and receives the light. The objective lens is installed on a first side of the substrate and focuses the light emitted from the laser diode onto a recording surface of a disc. The prism is installed on a second side of the substrate, transmits the light emitted from the laser diode toward the objective lens, and transmits the light reflected from the recording surface toward the photodetector. The optical element adjusts an optical path formed between the substrate and the prism.

According to another aspect of the present invention, a method of adjusting an optical path of an optical head includes preparing the optical head so as to include a substrate, installing a laser diode on the substrate to emit light, installing a photodetector on the substrate to receive the light, installing an objective lens on a first side of the substrate to focus the light emitted from the laser diode onto a recording surface of a disc, installing a prism that on a second side of the substrate to transmit the light emitted from the laser diode toward the objective lens and to transmit the light reflected from the recording surface toward the photodetector, and forming an optical element to adjust the optical path formed between the substrate and the prism. A first optical path through which the light is transmitted to the disc is adjusted by moving a first assembly body including the substrate and first optical elements assembled on the first side of the substrate relative to a second assembly body including second optical elements assembled on the second side of the substrate. A second optical path through which the light is received from the disc is adjusted by adjusting a position of the hologram and quarter wave plate with respect to the first assembly body.

According to another aspect to the present invention, an optical head includes a substrate mounted with a laser diode and a photodetector, a first assembly body disposed on a first side of the substrate, and having an objective lens, and a second assembly body disposed on a second side of the substrate, and having a prism.

According to another aspect to the present invention, an optical head includes a substrate mounted with a laser diode and a photodetector, a first assembly body disposed on a first side of the substrate, and having an objective lens movably mounted on the first side of the substrate to adjust a first optical path from the laser diode to an outside of the objective lens, and a second assembly body having a prism and a hologram element disposed on a second side of the substrate to adjust a second optical path from the objective lens to the photodetector.

According to another aspect to the present invention, a method of adjusting first and second optical paths in an optical head includes causing a first assembly body having an objective lens to be disposed on a first side of a substrate mounted with a laser diode and a photodetector, causing a second assembly body having a prism to be disposed on a second side of the substrate, causing a hologram element to be disposed between the second side of the substrate and the prism, moving the first assembly body to adjust the first optical path from the laser diode to an outside of the objective lens, and moving the hologram element to adjust the second optical path from the objective lens to the photodetector.

According to another aspect to the present invention, a method of adjusting one of first and second optical paths in an optical head includes causing a first assembly body having an objective lens to be disposed on a first side of a substrate mounted with a laser diode and a photodetector, causing a second assembly body having a prism to be disposed on a second side of the substrate, causing a hologram element to be disposed between the second side of the substrate and the prism, and moving the hologram element to adjust the second optical path from the objective lens to the photodetector without adjusting the first optical path from the laser diode to an outside of the objective lens.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
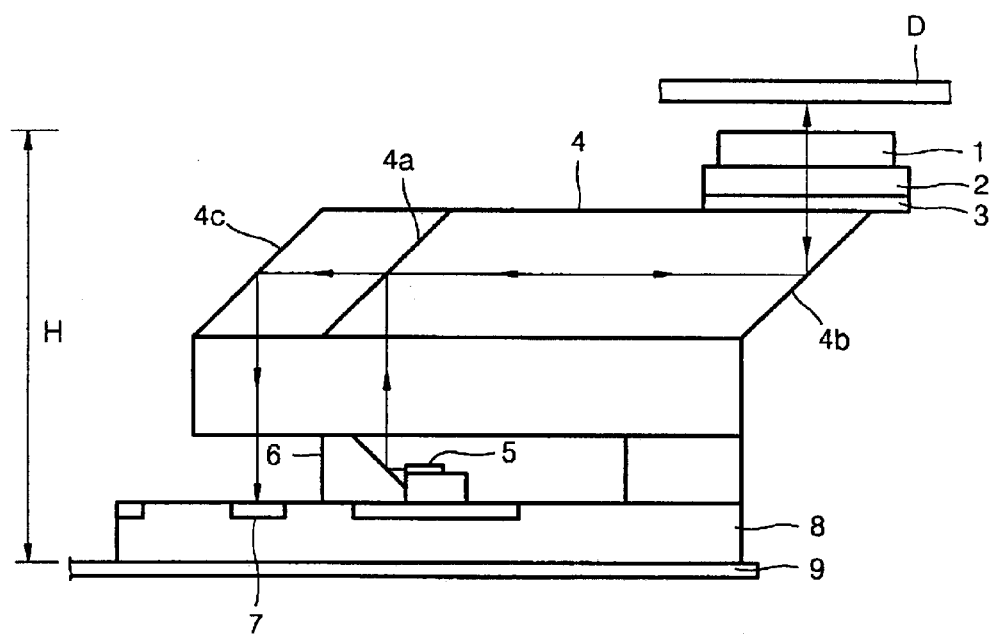
FIG. 1 illustrates a conventional optical head.
Figure 2:
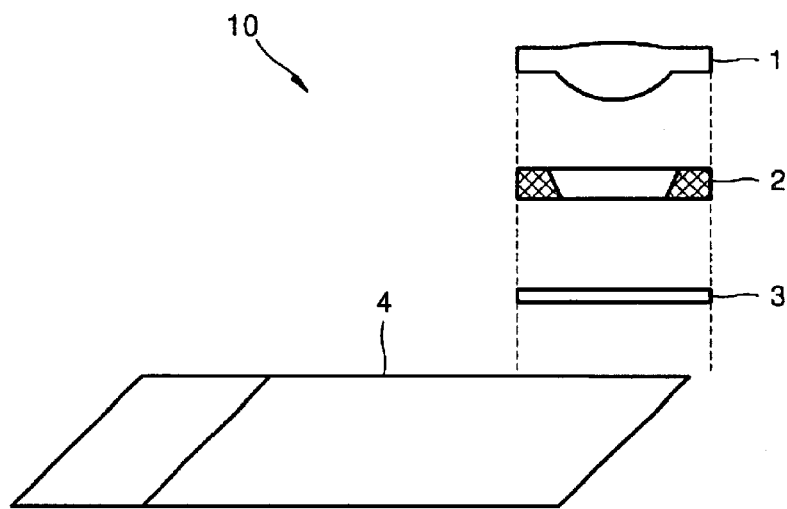
FIGS. 2 and 3 are views explaining a process of assembling the optical head shown in FIG. 1.
Figure 3:
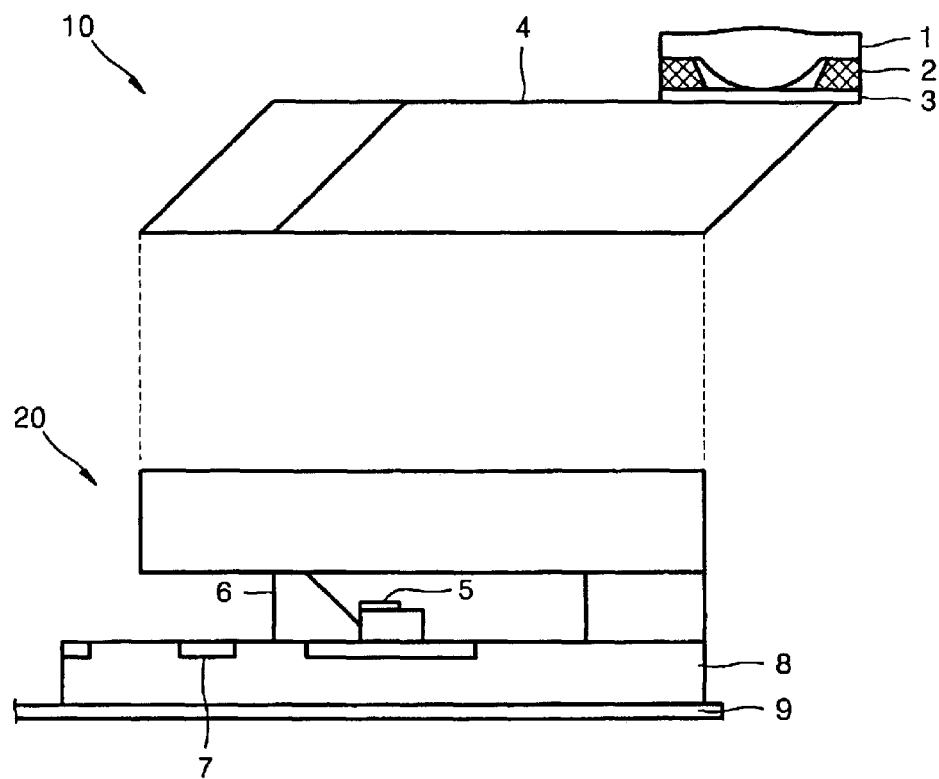
Figure 4:
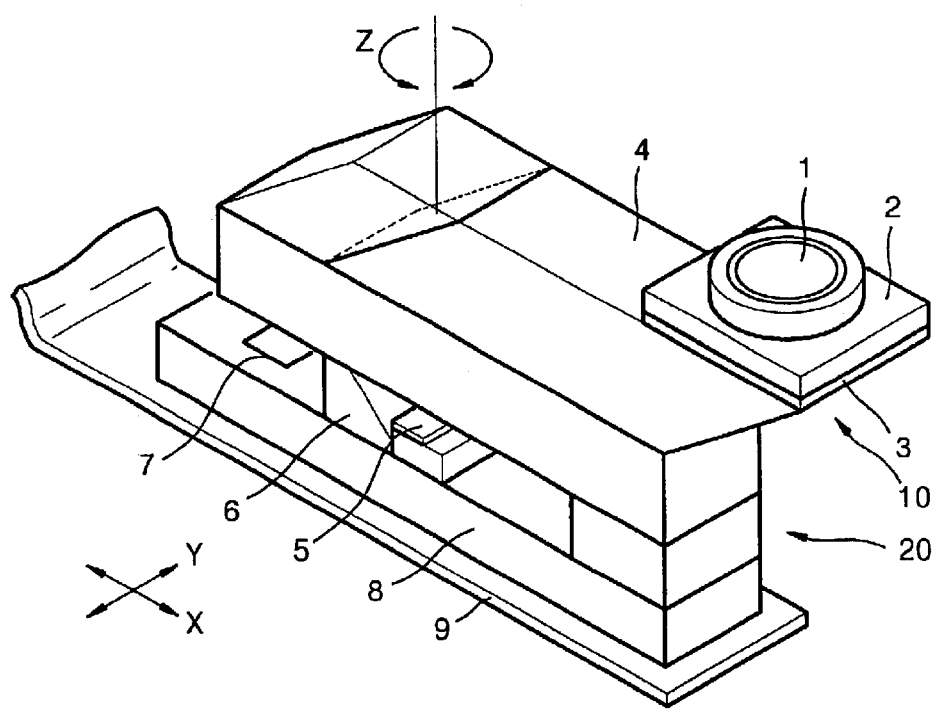
FIG. 4 is a view explaining a method of adjusting an optical path of the optical head shown in FIG. 1.
Figure 5:
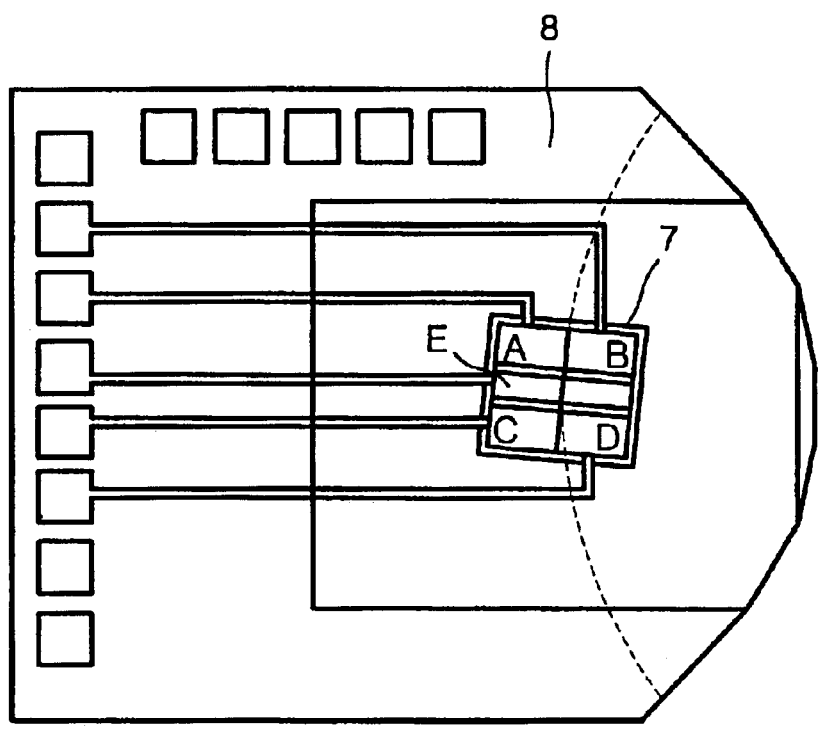
FIG. 5 is a view illustrating a trajectory of an optical spot passing through a PD when adjusting the optical path of the optical head shown in FIG. 4.

Reference will now be made in detail to the present preferred embodiment of the present invention, examples of which are illustrated in the accompanying drawings, wherein like reference numerals refer to the like elements throughout. The embodiment is described in order to explain the present invention by referring to the figures.

Figure 6:
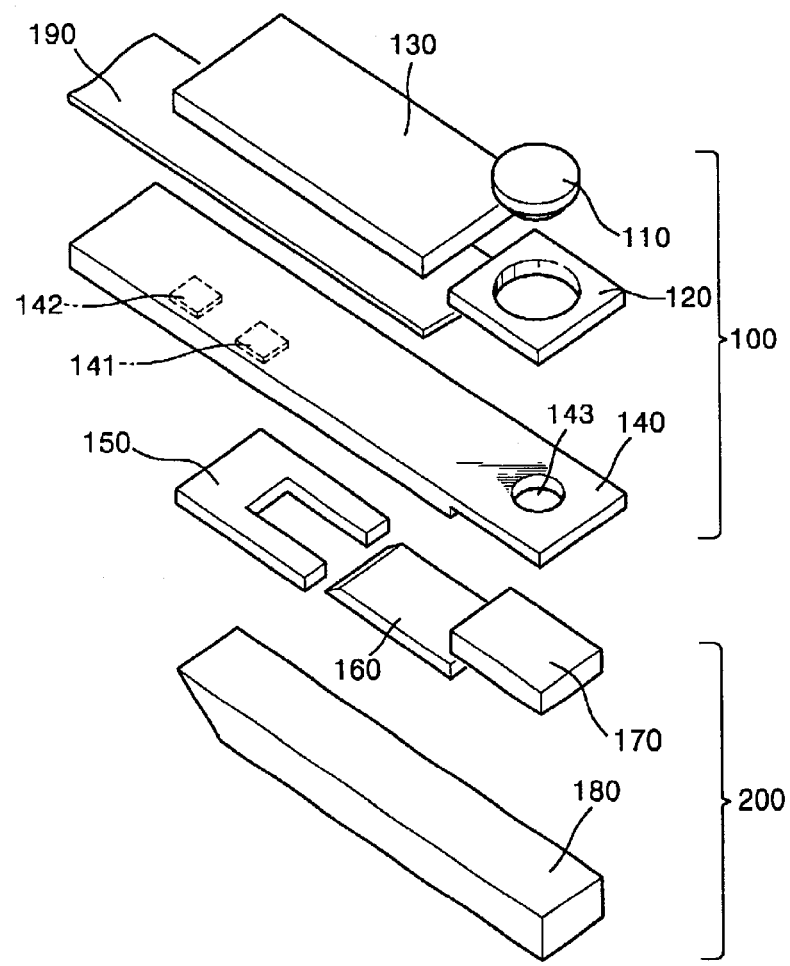
FIG. 6 is an exploded perspective view of an optical head according to an embodiment of the present invention.
Figure 7:
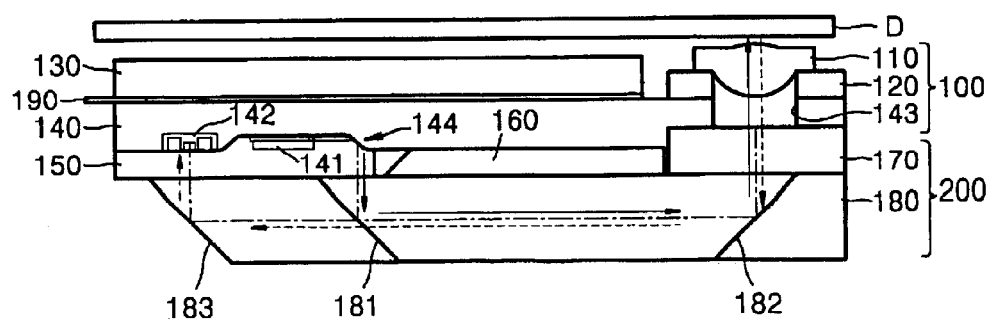
FIG. 7 is a view illustrating an optical path of the optical head shown in FIG. 6.

FIGS. 6 and 7 illustrate an optical head according to an embodiment of the present invention. Referring to FIGS. 6 and 7, the optical head includes a substrate 140, which is made of silicon-on-bench (SiOB) having a good thermal conductivity, an LD 141 and a PD 142 which are attached to a bottom surface of the substrate 140, an objective lens 110 which is installed over the substrate 140, a prism 180 which is installed under the substrate 140 and has a polarized light division function, a hologram element and quarter wave plate 170 which is installed between the substrate 140 and the prism 180 to be connected to the objective lens 110 via a through hole 143 formed in the substrate 140 so as to form an optical path. Reference numerals 120, 150, and 160 denote spacers, reference numeral 130 denotes a radiating plate, and reference numeral 190 denotes a plate spring which supports the optical head so that the optical head elastically moves and is used for transmitting and receiving signals between controllers (not shown) of the LD 141 and the PD 142. In other words, in this structure, optical elements are not stacked on the substrate 140 but arranged on first and second sides of the substrate 140. Here, first optical elements including the substrate 140, assembled on an upper (first) side of the substrate 140 are referred to as a first assembly body 100, and second optical elements assembled on a lower (second) side of the substrate 140 are referred to as a second assembly body 200.

The optical head having the above-described structure forms the optical path as shown in FIG. 7. In other words, light emitted from the LD 141 is reflected from a mirror 144 of the substrate 140 and then from a polarized surface 181 of the prism 180. The reflected light is then reflected from a mirror 182, is converted into a circularly polarized light by the hologram element and quarter wave plate 170, and becomes incident on a recording surface of a disc D via the objective lens 110. The light reflected from the recording surface of the disc D is converted into a linearly polarized light by the hologram element and quarter wave plate 170, is reflected from the mirror 182, passes through the polarized surface 181 of the prism 180, is then reflected from the mirror 183, and becomes incident on the PD 142.

According to the above-described structure, a height of the optical head according to the present invention can be reduced compared with the height of a conventional optical head shown in FIG. 1. In other words, the optical path of the conventional optical head ranges from an LD installed on a substrate to an objective lens layer by layer. However, in the present invention, the light emitted from the LD 140 installed beneath the substrate 140 proceeds downward and then upward to form a U-shaped optical path. Thus, when a first object distance from the LD 141 to the objective lens 110 of the optical head according to the present invention is equal to a second object distance from the LD 141 to the objective lens 110 of the conventional optical head, the structure of the optical head according to the present invention can be made slimmer. In addition, arranging the radiating plate 130 on a top layer, such as the objective lens 13, of the optical head is helpful to manufacture a slim optical head. In other words, in the conventional optical head, a radiating plate is attached onto a bottom surface of the substrate and thus is formed as an additional layer while in the optical head according to the present invention, the radiating plate 130 is attached onto a vacancy (space) next to the objective lens 110 over the substrate 140. Thus, the radiating plate 130 is not formed as the additional layer and shares a layer on which the objective lens 110 is installed, thereby reducing the height of the optical head. Like this, when the radiating plate 130 is installed on the top layer on which the objective lens 110 is installed, a radiation efficiency can be further increased. In other words, the disc D rotates at a high speed over the optical head during recording and/or reproducing data on and/or from the disc D using the optical head. In this case, when the radiating plate 130 is positioned on the top layer, the radiating plate 130 is exposed to an air current formed during a rotation of the disc D, which results in maximizing an air cooling efficiency. As a result, the radiating plate 130 can rapidly radiate heat generated by the LD 141.

Figure 8A:
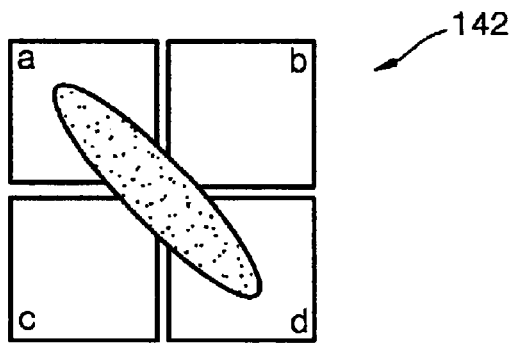
FIGS. 8A through 8C are views illustrating changes in an optical spot formed when adjusting the optical path of the optical head shown in FIG. 6.
Figure 8B:
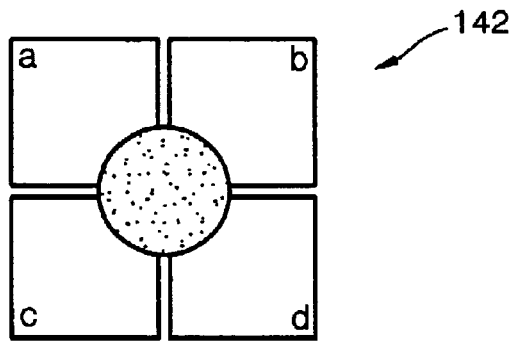
Figure 8C:
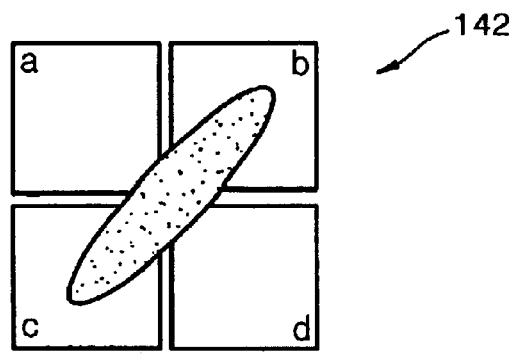

Moreover, when the optical head is assembled, it is very easy to adjust a first optical path through which the light is transmitted to the disc D, and a second optical path through which the light is received from the disc D. In other words, when assembling the optical head, the first assembly body 100 and the second assembly body 200 are separately assembled and then combined. In this process, when the first optical path through which the light is transmitted to the disc D, i.e., the first optical path ranging from the LD 141 to the objective lens 110, is desired to be adjusted, the first optical path is adjusted by moving the first assembly body 100 relative to the second assembly body 200. Also, the second optical path through which the light is received from the disc D, i.e., the second optical path through which the light is reflected from the disc D toward the PD 142, is adjusted by adjusting a position of the hologram element and quarter wave plate 170 with respect to the first assembly body 100. For this, the hologram and quarter wave plate 170 should be designed so as not to affect the first optical path through which the light is transmitted to the disc D although the position thereof is changed. In other words, a hologram element, which is designed to create astigmatism only for the light reflected from the disc D not for the light incident on the disc D, is used in the hologram and quarter wave plate 170. As shown in FIG. 8A, an optical spot having sub-optical spots with the same intensity is supposed to be focused on quarterly divided sensors of the PD 142 in an on-focus state due to the hologram element. The astigmatism occurs when a distance between the objective lens 110 and the recording surface of the disc D becomes too larger or too small. Thus, as shown in FIGS. 8B and 8C, the optical spot deforms. Therefore, the second optical path through which the light is received is adjusted with the hologram element and quarter wave plate 170 displaced so that the optical spot shown in FIG. 8A is formed.

As a result, even if the first optical path through which the light is received is adjusted by the hologram element and quarter wave plate 170 after adjusting the second optical path through which the light is transmitted, the first optical path through which the light is transmitted and the second optical path through which the light is received, can be independently adjusted without interference between the first and second optical paths. In other words, unlike the conventional optical head, in the present invention, when one of the first and second optical paths is adjusted, the other one of the first and second optical paths is not distorted.

It is possible that a wavelength of the light emitted from the LD 141 is within a range of 400 nm–800 nm and a numerical aperture (NA) of the objective lens 110 is within a range of 0.43–0.85 or is 0.85 or more. For example, when the LD 141 emits the light having an infrared wavelength of 780 nm and the NA of the objective lens 110 is within a range of 0.4–0.5, the optical head according to the present invention can be used for recording data on and/or reproducing data from a compact disc (CD). Also, when the LD 141 emits the light having a red wavelength of 650 nm and the NA of the objective lens 110 is within a range of 0.6–0.7, the optical head according to the present invention can be used for compatibly recording data on and/or reproducing data from a digital versatile disc (DVD) and the CD. Furthermore, when the LD 141 emits the light having a blue wavelength of 405 nm and the NA of the objective lens 110 is 0.85, the optical head according to the present invention can be used for compatibly recording data on and/or reproducing data from a high-density disc, the DVD, and the CD. Moreover, the optical head according to the present invention can be used in an optical system having an NA of 0.85, such as an SIL or the like.

As described above, in the optical head according to the present invention, the substrate can be arranged in a middle of an optical head assembly body of the optical head so that the U-shaped optical path is formed. Thus, the same object distance can be secured and the optical head can be made slimmer.

Also, since a hologram, which affects only changes in the second optical path through which the light is received, can be used, the first optical path through which the light is transmitted, and the second optical path through which the light is received, can be separately adjusted. Thus, an adjustment process can be conveniently performed.

Furthermore, the radiating plate, which radiates the heat generated by the LD, can be installed on the top layer on which the objective lens is installed so as to be exposed to the air current formed during the rotation of the disc. As a result, the radiation efficiency can be maximized and the optical head can be made slimmer.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. An optical head comprising:
   a substrate;
   a laser diode that is installed on the substrate and emits light;
   a photodetector that is installed on the substrate and receives the light;
   an objective lens that is installed on a first side of the substrate and focuses the light emitted from the laser diode onto a recording surface of a disc;
   a prism that is installed on a second side of the substrate, transmits the light emitted from the laser diode toward the objective lens, and transmits the light reflected from the recording surface toward the photodetector; and
   an optical element that adjusts an optical path formed between the substrate and the prism.

2. The optical head of claim 1, further comprising:
   a radiating plate that is installed on the first side of the substrate and radiates heat generated by the laser diode.

3. The optical head of claim 2, wherein the radiating plate is disposed adjacent to the disc so as to be directly exposed to an air current formed during a rotation of the disc.

4. The optical head of claim 1, wherein the substrate comprises:
a through hole connecting the first and second sides of the substrate so that the optical path through which the light is transmitted and received, are formed through the through hole.

5. The optical head of claim 1, further comprising:
spacers disposed between the substrate and the objective lens.

6. The optical head of claim 1, further comprising:
spacers disposed between the substrate and the prism.

7. The optical head of claim 1, wherein the prism comprises:
a polarized light division function.

8. The optical head of claim 1, wherein the optical element comprises:
a hologram element and quarter wave plate.

9. The optical head of claim 1, wherein the objective lens comprises:
one of a plastic material, a glass material, and a material using a diffraction element.

10. A method of adjusting an optical path of an optical head, the method comprising:
preparing the optical head to include a substrate, a laser diode that is installed on the substrate and emits light, a photodetector that is installed on the substrate and receives the light, an objective lens that is installed on a first side of the substrate and focuses the light emitted from the laser diode onto a recording surface of a disc, a prism that is installed on a second side of the substrate, transmits the light emitted from the laser diode toward the objective lens, and transmits the light reflected from the recording surface toward the photodetector, and an optical element that adjusts first and second optical path formed between the substrate and the prism;
adjusting the first optical path through which the light is transmitted to the recording surface of the disc, by moving a first assembly body including the substrate and first optical elements assembled on the first side of the substrate relative to a second assembly body including second optical elements assembled on the second side of the substrate; and
adjusting the second optical path through which the light is received from the recording surface of the disc, by adjusting a position of the hologram and quarter wave plate with respect to the first assembly body.

11. An optical head comprising:
a substrate mounted with a laser diode and a photodetector;
a first assembly body disposed on a first side of the substrate, and having an objective lens; and
a second assembly body disposed on a second side of the substrate, and having a prism.

12. The optical head of claim 11, wherein the substrate comprises a surface formed on the second side to face the prism, and the laser diode and the photodetector are mounted on the surface of the substrate.

13. The optical head of claim 11, wherein the first and second sides of the substrate are disposed opposite to each other.

14. The optical head of claim 11, wherein the laser diode emits light, the prism receives the light from the diode and transmits the light to the objective lens, and the light travels from the second side to the first side of the substrate.

15. The optical head of claim 11, wherein the substrate comprises:
a through hole through which the objective lens communicates with the prism.

16. The optical head of claim 15, wherein the prism comprises:
a first portion disposed adjacent to the laser diode and the photodetector; and
a second portion disposed adjacent to the through hole.

17. The optical head of claim 15, wherein the first portion and the second portion are made of a monolithic single body.

18. The optical head of claim 15, wherein the first portion comprises:
a first surface reflecting light emitted from the laser diode toward the second portion; and
a second surface reflecting the light received from the second portion to the photodetector.

19. The optical head of claim 18, wherein the substrate comprises:
a substrate mirror formed on a surface of the second side of the substrate to reflect the light emitted from the laser diode to the first surface of the first portion of the prism.

20. The optical head of claim 18, wherein the first surface is disposed to be parallel to the second surface.

21. The optical head of claim 11, further comprising:
a hologram element disposed between a portion of the prism and the second side of the substrate.

22. The optical head of claim 21, wherein the objective lens is disposed opposite to the hologram element with respect to the substrate.

23. The optical head of claim 21, wherein the hologram element, the objective lens, and the portion of the prism are disposed on a line perpendicular to the first and second sides of the substrate.

24. The optical head of claim 23, wherein the laser diode and another portion of the prism corresponding to the laser diode are disposed on a second line perpendicular to the first and second sides of the substrate, and the second line is spaced-apart from the line.

25. An optical head comprising:
a substrate mounted with a laser diode and a photodetector;
a first assembly body disposed on a first side of the substrate, and having an objective lens movably mounted on the first side of the substrate to adjust a first optical path from the laser diode to an outside of the objective lens; and
a second assembly body having a prism and a hologram element disposed on a second side of the substrate to adjust a second optical path from the objective lens to the photodetector.

26. An optical head comprising:
a substrate mounted with a laser diode and a photodetector;
a first assembly body disposed on a first side of the substrate, and having an objective lens movably mounted on the first side of the substrate; and
a second assembly body having a prism and a hologram element disposed on a second side of the substrate,
wherein first and second optical paths are formed between the objective lens and the laser diode and the photodetector, respectively, in first and second U-shaped optical paths, respectively.

27. A method of adjusting first and second optical paths in an optical head, the method comprising:

depositing a first assembly body having an objective lens on a first side of a substrate mounted with a laser diode and a photodetector;

depositing a second assembly body having a prism on a second side of the substrate;

depositing a hologram element between the second side of the substrate and the prism;

moving the first assembly body to adjust the first optical path from the laser diode to an outside of the objective lens; and moving the hologram element to adjust the second optical path from the objective lens to the photodetector.

28. A method of adjusting first and second optical paths in an optical head, the method comprising:

depositing a first assembly body having an objective lens on a first side of a substrate mounted with a laser diode and a photodetector;

depositing a second assembly body having a prism on a second side of the substrate;

depositing a hologram element to be disposed between the second side of the substrate and the prism; and moving the hologram element to adjust the second optical path from the objective lens to the photodetector without adjusting the first optical path from the laser diode to an outside of the objective lens.

29. An optical head having an objective lens, a laser diode, and a photodetector, comprising:

a unit having a hologram element and a quarter wave plate, and disposed between the objective lens and the laser diode and the photodetector;

a first optical path on which light generated from the laser diode is transmitted to the objective lens through the unit; and a second optical path on which the light is transmitted to the photodetector through the unit, wherein the unit is moved with respect to the objective lens, the laser diode, and the photodetector to independently adjust the second optical path without interference between the first and second optical paths.

30. A method in an optical head having an objective lens, a laser diode, and a photodetector, comprising:

depositing a unit having a hologram element and a quarter wave plate between the objective lens and the laser diode and the photodetector;

forming a first optical path on which light generated from the laser diode is transmitted to the objective lens through the unit;

forming a second optical path on which the light is transmitted to the photodetector through the unit; and adjusting the unit with respect to the objective lens, the laser diode, and the photodetector to independently adjust the second optical path without interference between the first and second optical paths.

* * * * *